United States Patent [19]
Aizawa et al.

[11] Patent Number: 4,919,469
[45] Date of Patent: Apr. 24, 1990

[54] AUXILIARY SUN VISOR FOR AUTOMOBILE

[76] Inventors: Genya Aizawa, 201 Hayashicho Mansion, 30-2, Sendagi 5 chome, Bunkyo-ku, Tokyo 113; Kakuhisa Ono, 10-45, Chiyogaoka 6 chome, Aso-ku, Kawasaki-shi, Kanagawa 215, both of Japan

[21] Appl. No.: 204,390
[22] Filed: Jun. 9, 1988
[51] Int. Cl.$^5$ ............................................. B60J 3/02
[52] U.S. Cl. ..................... 296/97.6; 296/97.11; 296/97.12
[58] Field of Search ............. 296/97.1, 97.4, 97.5, 296/97.6, 97.9, 97.11–97.13

[56] References Cited

U.S. PATENT DOCUMENTS

| | | | |
|---|---|---|---|
| 2,894,576 | 7/1959 | Williams | 296/97.6 X |
| 3,410,602 | 11/1968 | Shüler | 296/97.6 |
| 3,853,370 | 12/1974 | Barnhart | 296/97.6 |
| 3,877,745 | 4/1975 | Girard | 296/97.6 |
| 4,317,589 | 3/1982 | Kuss | 296/97.6 |
| 4,526,415 | 7/1985 | Jardine | 296/97.6 |

FOREIGN PATENT DOCUMENTS 475136 11/1937 United Kingdom ............ 296/97.12

Primary Examiner—Dennis H. Pedder
Attorney, Agent, or Firm—McGlew & Tuttle

[57] ABSTRACT

An improved auxiliary sun visor. It comprises a base plate removably attached to a sun visor installed against a windshield of an automobile and having a guide hole therein with a movable member slidably mounting in the guide hole. The movable member can be fixed at a suitable position along said elongate guide hole and a colored transparent light shielding plate can be attached to the movable member. The colored transparent light shielding plate can change its angle in horizontal or vertical plane freely in accordance with the need of the driver. Further using a strap piece, the attachment of the auxiliary sun visor is facilitated.

7 Claims, 6 Drawing Sheets

FIG.5
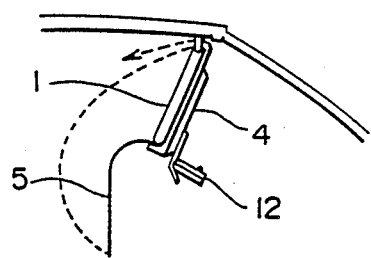
FIG.6
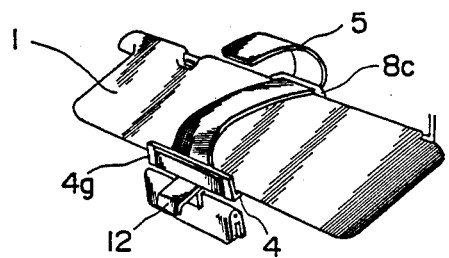
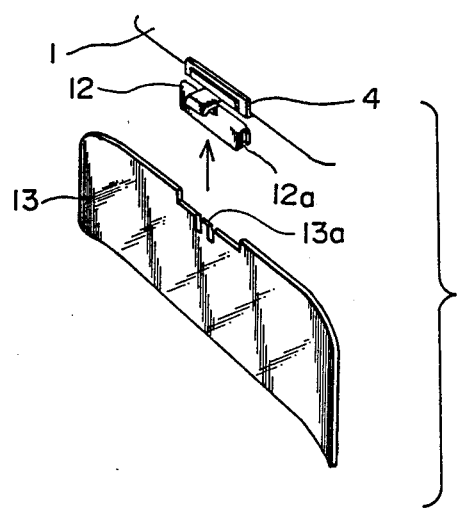
FIG.7

AUXILIARY SUN VISOR FOR AUTOMOBILE

BACKGROUND OF THE INVENTION

1. Field of the Invention

The present invention relates to an improved auxiliary sun visor attached to the ordinary sun visor which is capable of changing its angle as the driver feels blinded or dazzled in the direct sun light and more particularly to an improved auxiliary sun visor which dims the sun shine by means of a colored transparent light shielding plate.

2. Description of the Prior Art

A conventional auxiliary sun visor of this type is attached to the ordinary sun visor by means of attaching means such as clips and a light shielding plate is made capable of changing its angle on hinges provided between said colored transparent shielding plate and the attaching means.

When there is no need to shield the sun shine, said auxiliary sun visor is folded onto the sun visor. When needed, the auxiliary sun visor is allowed to suspend such that the sun shine comes in therethrough to lessen the blinding or dazzling effect.

However, there are times when it is necessary to entirely lower the shielding plate depending on the position of the sun for the purpose of shielding the sun shine. On the contrary, a half lowered shielding plate can divide the vision into two portions which is viewed through the colored shielding plate and which is viewed directly. As a result, the front view is an uncomfortable one due to the contrast between the natural portion and the dimmed portion.

SUMMARY OF THE INVENTION

It is therefore an object of the invention to provide an improved auxiliary sun visor which is capable of adjusting the angle of the sun visor according to the need of the driver.

Another object of the invention is to provide an improved auxiliary sun visor capable of adjusting the angle of the auxiliary sun visor in a horizontal plane as well as a vertical plane. A further object of the invention is to provide an improved auxiliary sun visor which can be firmly attached to the sun visor with a simple means. The first object is realized by an auxiliary sun visor comprising an auxiliary sun visor for an automobile including a base plate removably attached to the main sun visor installed against a windshield of the automobile, said base plate being formed with a guide hole; a movable member slidably mounted in said guide hole; means for fixing said movable member at a suitable position along said elongate guide hole; and a colored transparent light shielding plate attached to said movable member.

The second object is realized by further making one element connecting the auxiliary sun visor and the main sun visor a rotary member capable of rotating in a horizontal plane and a vertical plane.

The third object is realized by further providing a strap piece to bind the auxiliary sun visor to the main sun visor.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

FIGS. 5 through 7 are perspective views showing the order of attachment;

DETAILED DESCRIPTION OF THE EMBODIMENTS

Figure 1:
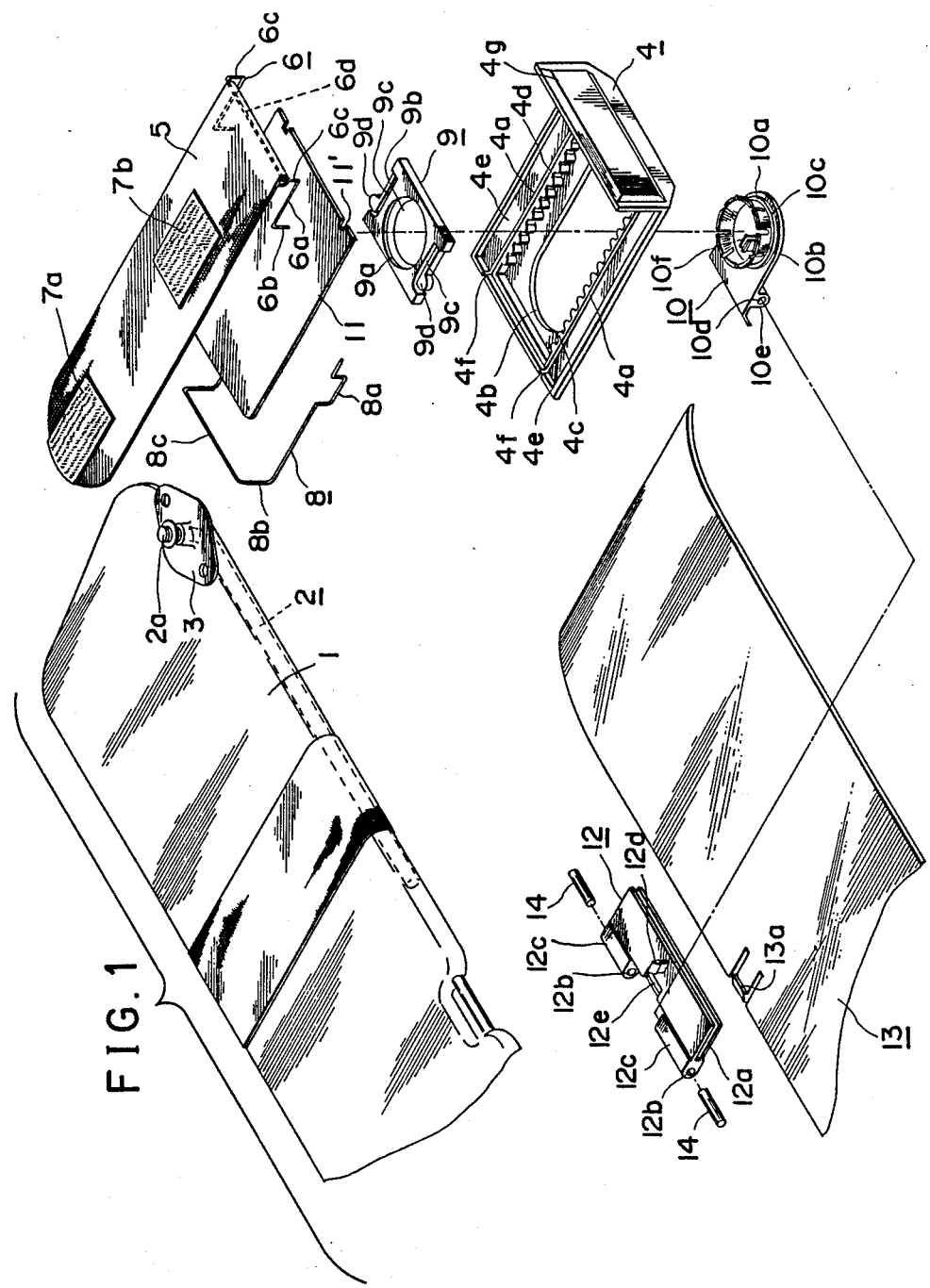
FIG. 1 is an exploded view of the embodiment of the present invention.
Figure 2:
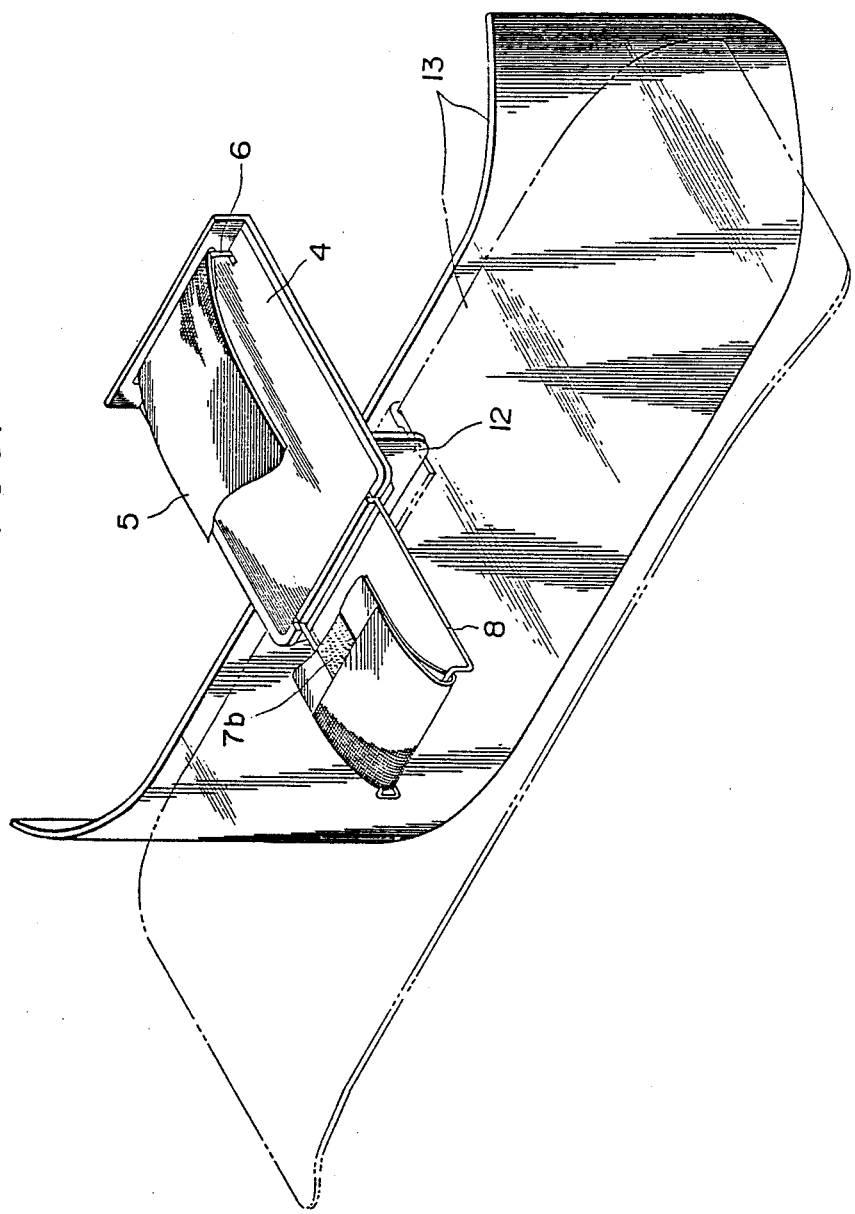
FIG. 2 is a perspective view of the embodiment of the present invention in an assembled state.
Figure 3:
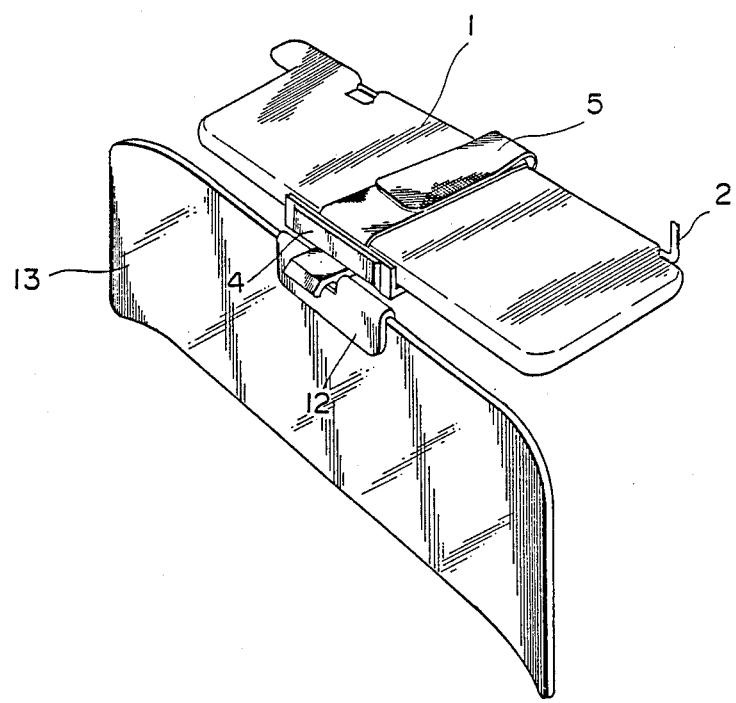
FIG. 3 is a perspective view of the assembled embodiment of the present invention attached to the main sun visor.
Figure 4:
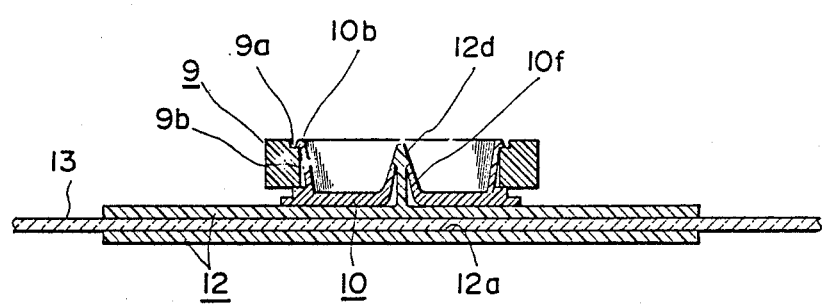
FIG. 4 is a sectional view of an attachment plate and a movable member used in the embodiment of the invention for engaging each other.

An embodiment of this invention will be described with reference to the drawings.

Reference numeral 1 designates a sun visor attached in advance to an automobile to be rotatable with respect to a supporting shaft 2. The supporting shaft 2 is attached rotatably with respect to the ceiling of the automobile to fittings or a bracket 3 at the right angle bent portion 2a thereof.

Therefore, the sun visor 1 can be pivotally turned to the side of a windshield or a side window by rotating the supporting shaft 2 with respect to the bracket 3, and can also be laid horizontally or suspended down by pivotally turning itself around the supporting shaft 2.

Numeral 4 denotes a base plate for attaching an auxiliary sun visor to the sun visor 1, on which grooves 4a are formed at right and left sides.

Numeral 5 indicates a strap piece formed with a fitting 6 having horizontal portions 6a to be inserted into the grooves 4a, suspending ends 6b suspended downward from horizontal portion 6a and right and left rising portions 6c, erected upward from the horizontal portions 6a, arranged laterally and symmetrically, and middle portions 6d connecting the right rising portion 6c to the left rising portion 6c.

The strap piece 5 also has a hook and loop fastener piece 7a attached to one end thereof to be folded at one end, and a cooperating hook and loop fastener cloth piece 7b so attached to a position near the middle portion 6d separately from the hook and loop fastener 7a as to be engaged with the magic tape 7a.

Numeral 8 depicts a strap engagement piece having guides ia inserted into the grooves 4a to be slid therein, right and left rising portions 8b erected from the guide 8a at both right and left ends laterally symmetrically, and a strap folding portion 8c for connecting the right rising portion 8b to the left rising portion 8b.

Strap engagement piece 8 extends around one side of the visor 1 such that strap engaging portion 8c engages the strap 5 on the other side of visor 1.

An elongate guide hole 4b which is long in its longitudinal direction is perforated at the center of the base plate 4, and right and left walls 4d having projections 4c are erected at both right and left ends of the guide hole 4b.

A movable member 9 having a width substantially equal to a distance between the right and left walls 4d is inserted between the right and left walls 4d.

The movable member 9 has an opening 9b including a step 9a, perforated at the center thereof, right and left lateral cutouts 9c formed at both right and left ends thereof on the lateral faces thereof to form projections 9d each having elasticity.

Therefore, the movable member 9 can move longitudinally between the right and left walls 4d but member 9 is stopped in a clicking manner at a suitable position by engaging the projections 4c with the projections 9d.

Numeral 10 designates a first rotor having a collar 10a to be inserted into the guide hole 4b in such a manner that the collar 10a are divided upward by many cutouts to form ring-shaped engaging portions 10c each having a tapered step 10b at the upper end thereof.

The first rotor 10 is engaged with the step 9a by inserting the engaging portions 10c into the opening 9b of the movable member 9 in such a manner that the steps 10b are inserted into the opening 9b, prevented from being removed from the opening 9b and the engaging portion 10c can freely turn in the opening 9b such that said first rotor 10 rotates in a first plane common with the base plate 4.

Thus, the movable member 9 is placed between the right and left walls 4d, the engaging portion 10c of the first rotor 10 is engaged within the opening 9b, the guide 9a of the strap engaging piece 8, the horizontal portions 6a of the fittings 6 and the suspending end 6b are then inserted into the grooves 4a of the base plate 4, and a cover plate 11 is bonded to the step 4e of the base plate 4.

Then, the rising portions 6c of the fittings 6 are projected upward from the cutouts 11' of the cover plate 11, and the fittings 6 are thus fixed to the base plate 4.

One strap engaging piece 8 is drawn at the strap folding portion 8c to a suitable position by sliding the guides 8a in the grooves 4a, but stopped when further drawn in such a manner that the guides 8a are contacted with the end 4f of the grooves 4a.

Numeral 12 denotes an attachment plate formed with a groove 12a to which a light shielding plate 13 is inserted and also formed with a projection 12c formed with axial bores 12b at both right and left sides of the front portion thereof.

The first rotor 10 is formed with a projection 10e having an axial bore 10d on the lower surface thereof. The attachement plate 12 is longitudinally movable with respect to the first rotor 10 by friction fitting a shaft 14 into the axial bores 12b and 10d. Thus, the attachment plate 12 becomes a second rotor which rotates in a second plane perpendicular to said base plate.

An engaging portion 12d swelled at the upper end thereof in a tapered shape is formed on the upper surface of the attachment plate 12 while the first rotor 10 is formed with holding portions 10f for holding the swelled portion from both right and left sides when the engaging portion 12d is inserted into the first rotor 10.

Thus, when the light shielding plate 13 is laid along the sun visor 1 as will be described, the engaging portion 12d is held by the holding portions 10f to properly hold the light shielding plate 13.

The light shielding plate 13 is made of a polycarbonate transparent material whih is colored, to a smoke appearance. The plate 13 is bent at both right and left ends backward when suspended down to perform an antidazzling function by means of curvature and the color.

When the tapered step 13a is inserted into the groove 12a, the tapered step 13a is engaged with the recess 12e of the attachment plate 12 to prevent the step 13a from being removed from the recess 12e.

As shown in FIG. 5, the strap piece 5 is suspended down, the projection 4g of the base plate 4 is contacted with the lower side of the sun visor 1, and the cover plate 11 (not shown) is disposed on the windshield side of the sun visor 1.

As shown in FIG. 6, the strap folding portion 8c of the strap engaging piece 8 is drawn to the position in contact with the upper side of the sun visor 1, the strip piece 5 is then inserted under the strap folding portion 8c, folded back and engaged at the hook and loop fastener piece 7a with the hook and loop fastener cloth piece 7b.

Next, the auxiliary sun visor for the automobile is attached to the sun visor 1 as shown in FIG. 7. That is, the light shielding plate 13 is then inserted to the groove 12a, the tapered step 13a is engaged within the recess 12e, and the light shielding plate 13 is attached to the attachment plate 12.

Figure 8:
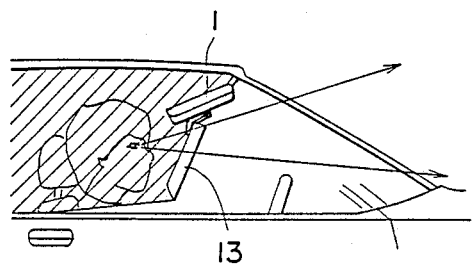
FIGS. 8 through 11 side views showing various uses of the device of the invention.

In the auxiliary sun visor for the automobile, the light shieldig plate 13 is allowed to suspend down in front of the driver's face as shown in FIG. 8 to be used as sunglasses when running in the direction of strong sunshine. This arrangement prevents the reflection of the sunshine by the smoke color, thereby obtaining a wide visibility.

Figure 9:
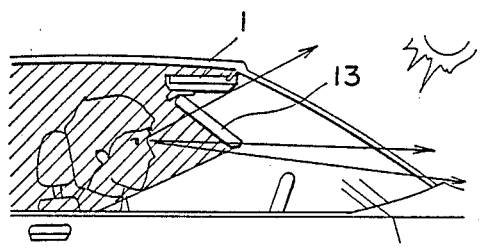

When the sun shines from the intermediate upward direction of the driver's seat so that the sun shines directing in the driver's eyes, the light shielding plate 13 is inclined forward of the face as shown in FIG. 9 to dim the direct incident sun shining in the eyes.

In this case, however, when the sun rays are shielded by the sun visor 1, the driver's upward visibility is lost. However, this sun visor can obtain the upward visivility, thereby improving the safety of driving the automobile.

Figure 10:
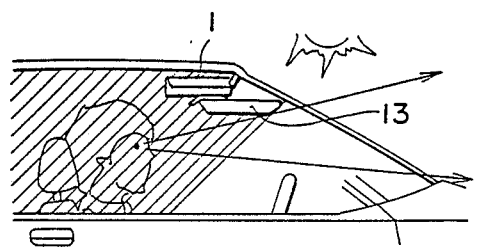

When the sun shines faces slightly upward as compared with the case of FIG. 9, the first rotor 10 is moved along the guide hole 4b of the base plate 4 to the windshield side. Then, even if the light shielding plate 13 is not inclined to the face, it can prevent the sun rays from being directly incident to the eyes as shown in FIG. 10.

Thus, the vision is not divided into the two portions unlike the case in FIG. 9 in which one of the two portions passes the light shielding plate 13 while the other does not pass the light shielding plate 13. Therefore, the sun rays will not dazzle the eyes, thereby enjoying a comfortable driving.

Figure 11:
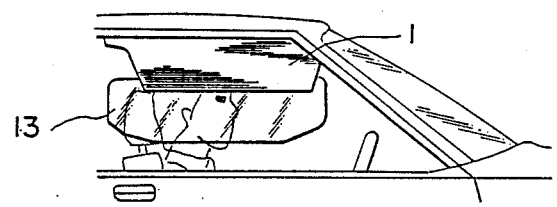

As shown in FIG. 11, when the sun visor is turned to the side window, the light shielding plate 13 is suspended down to shield the sidewise lights which cannot be shielded by the sun visor 1.

Figure 12:
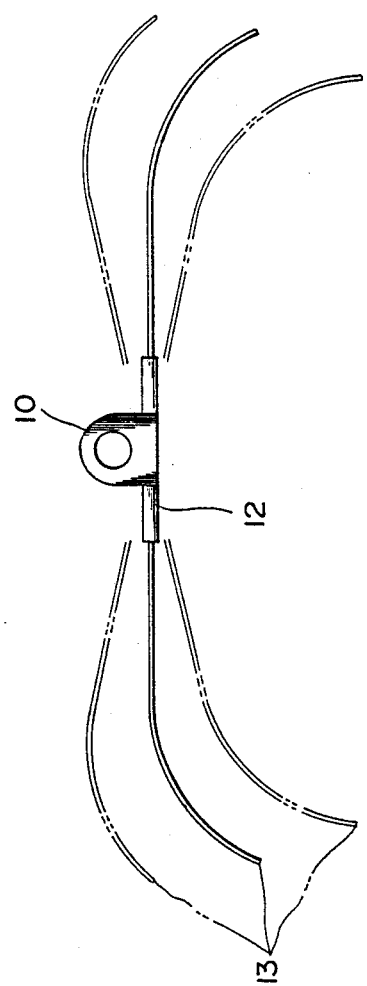
FIG. 12 is a plan view showing the rotation of the light shielding plate in a horizontal plane.

Since the first rotor 10 hinged with the attachment plate 12 is rotatable with respect to the movable member 9, the light shielding plate 13 can be rotated clockwise or counterclockwise as shown in FIG. 12.

Thus, the light shielding plate 13 can be rotated by the above-mentioned rotation of the light shielding plate 13 against the incident light obliquely laterally to dim the incident light.

As described above, the auxiliary sun visor for the automobile is easily and reliably attached to the sun visor 1, and can dim the light incident to the eyes in the directions of various incident lights only by operating the light shielding plate 13 without operating the sun visor 1 except the state shown in FIG. 11.

Therefore, it can prevent the uncertain confirmation of the forward direction due to the dazzlement and the limited vision. The invention eliminates many detractions when operating the sun visor 1 to eliminate dangers of driving, thereby remarkably contributing to the safety of driving.

What is claimed is:

1. An auxiliary sun visor for an automobile comprising a base plate removably attached to a sun visor installed against a windshield of the automobile, said base plate being formed with an elongate guide hole;
   a movable member slidably mounted in said elongate guide hole; means for fixing said movable member at a suitable position along said elongate guide hole;
   a colored transparent light shielding plate attached to said movable member;
   a strap piece having a first end attached to said base plate and a second end including fastening means; and,
   strap folding means attached to said base plate extending from said base plate on one side of the sun visor at a lower end of the sun visor, and including a strap folding portion extending to the other side of said sun visor at an upper end, opposite said base plate, said strap folding means for engaging said strap piece as it is folded around said strap folding portion such that said fastening means on an end of said strap piece engages additional fastening means on said strap piece thereby retaining said base plate fixed to said sun visor.

2. An auxiliary sun visor for an automobile according to claim 1, wherein said movable member includes a rotary member adapted to rotate about an axis thereof in a first plane substantially parallel with said base plate, said colored transparent light shielding plate being attached to said movable member by way of a second rotary member adapted to rotate in a second plane perpendicular to base plate.

3. An auxiliary sun visor construction for use with an automobile visor comprising: a base plate having an elongate guide hole; a movable member slidably mounted in said elongate guide hole; fixing means for fixing said movable member relative to said base plate at a location within said elongate guide hole; a light shielding plate connected to said movable member; a strap member having a first end attached to said base plate and having a second end, said strap member including fastening means with a first fastening element at said strap second end and a second strap fastening element intermediate said strap first end and said strap second end; and, strap engagement means extending from said base plate, said strap engagement means including a strap folding portion extending from a first side of the automobile visor adjacent the automobile visor upper end to a second side of the automobile visor adjacent the automobile visor upper end when said base plate is positioned adjacent said visor first side lower end, said strap engagement means for engaging said strap as said strap is folded back over said strap folding portion, on said automobile visor second side, and said strap first fastening element engages said strap second fastening element.

4. An auxiliary sun visor according to claim 3, wherein: said light shielding plate is transparent and colored to shield out light rays.

5. An auxiliary sun visor according to claim 3, wherein: said movable member includes a circular opening, a rotary member being positioned within said circular opening of said movable member so as to allow said rotary member to rotate about a central axis of said circular opening.

6. An auxiliary sun visor according to claim 5, wherein: said shielding plate is connected to said rotary member by means of a second rotary member adapted to rotate about an axis perpendicular to the axis of rotation of said rotary member.

7. An auxiliary sun visor construction for use with an automobile visor comprising: a base plate having an elongate guide hole; a movable member slidably mounted on said base plate; fixing means for fixing said movable member relative to said base plate at a location adjacent said elongate guide hole; a rotary member engaged with said movable member within a circular opening of said movable member, said rotary member being positioned within said circular opening of said movable member for rotation of said rotary member about a central axis of said circular opening; pivot means connected to said rotary member, said pivot means being pivotable about an axis substantially perpendicular to said central axis of said circular opening; a light shielding plate; means for releasably connecting said light shielding plate to said pivot means; a strap member including a first end and a second end connected to said base plate, said strap member first end having a first fastening element and said strap member having a second fastening element intermediate said strap member first end and said strap member second end; and, strap engagement means including a strap folding portion, said engagement means extending from said base plate on one side of said visor to another side of said visor, for engaging said strap as said strap extends from said base plate along said another side of said visor and is folded back over said strap folding portion such that said first strap engagement element is fastened to said second strap engagement element.

* * * * *